US011483615B2

(12) United States Patent
Gibbon et al.

(10) Patent No.: US 11,483,615 B2
(45) Date of Patent: Oct. 25, 2022

(54) METHODS, SYSTEMS, AND DEVICES FOR PROVIDING A USER EXPERIENCE ASSOCIATED WITH A PAUSE IN PRESENTING MEDIA CONTENT

(71) Applicant: AT&T Intellectual Property I, L.P., Atlanta, GA (US)

(72) Inventors: David Crawford Gibbon, Lincroft, NJ (US); Eric Zavesky, Austin, TX (US); Lee Begeja, Gillette, NJ (US); Tan Xu, Bridgewater, NJ (US); Paul Triantafyllou, Summit, NJ (US); Jean-Francois Paiement, Sausalito, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/095,033

(22) Filed: Nov. 11, 2020

(65) Prior Publication Data

US 2022/0150573 A1    May 12, 2022

(51) Int. Cl.
*H04N 21/433* (2011.01)
*H04N 21/2387* (2011.01)
*H04N 21/81* (2011.01)

(52) U.S. Cl.
CPC ..... *H04N 21/4333* (2013.01); *H04N 21/2387* (2013.01); *H04N 21/4331* (2013.01); *H04N 21/812* (2013.01)

(58) Field of Classification Search
CPC .......... H04N 21/4333; H04N 21/2387; H04N 21/4331; H04N 21/812
See application file for complete search history.

(56) References Cited

U.S. PATENT DOCUMENTS

| | | | |
|---|---|---|---|
| 2003/0037068 A1* | 2/2003 | Thomas | H04N 21/6125 |
| 2005/0251835 A1* | 11/2005 | Scott, III | H04N 21/4333 725/88 |
| 2006/0227721 A1* | 10/2006 | Hirai | H04L 43/0817 370/254 |
| 2008/0016526 A1* | 1/2008 | Asmussen | H04N 7/025 725/34 |
| 2008/0212939 A1* | 9/2008 | Furuichi | H04N 21/41407 386/349 |
| 2015/0089372 A1* | 3/2015 | Mandalia | G11B 27/34 715/720 |
| 2018/0322529 A1* | 11/2018 | Greenzeiger | G06Q 30/0251 |

* cited by examiner

*Primary Examiner* — Chenea Davis
(74) *Attorney, Agent, or Firm* — Guntin & Gust, PLC; Andrew Gust

(57) ABSTRACT

Aspects of the subject disclosure may include, for example, providing media content to a communication device. The communication device provides a playback of a presentation of the media content. Further embodiments can include receiving an indication from the communication device that indicates a pause in the presentation of the media content, and determining a plurality of attributes associated with the pause. Additional embodiments can include providing instructions according to the plurality of attributes associated with the pause to the communication device. Other embodiments are disclosed.

20 Claims, 16 Drawing Sheets

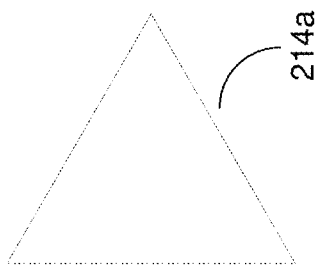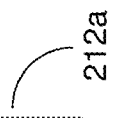
FIG. 2C

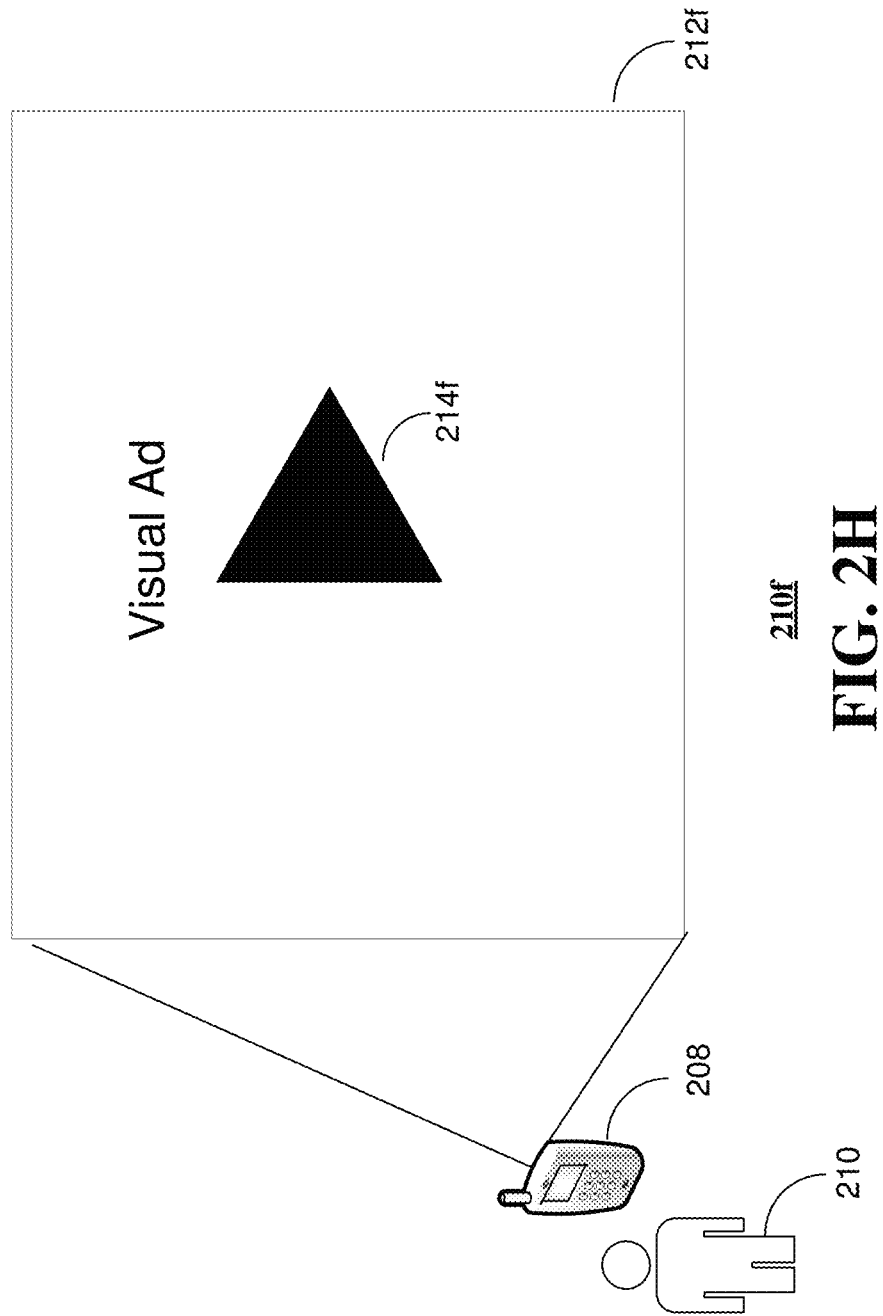

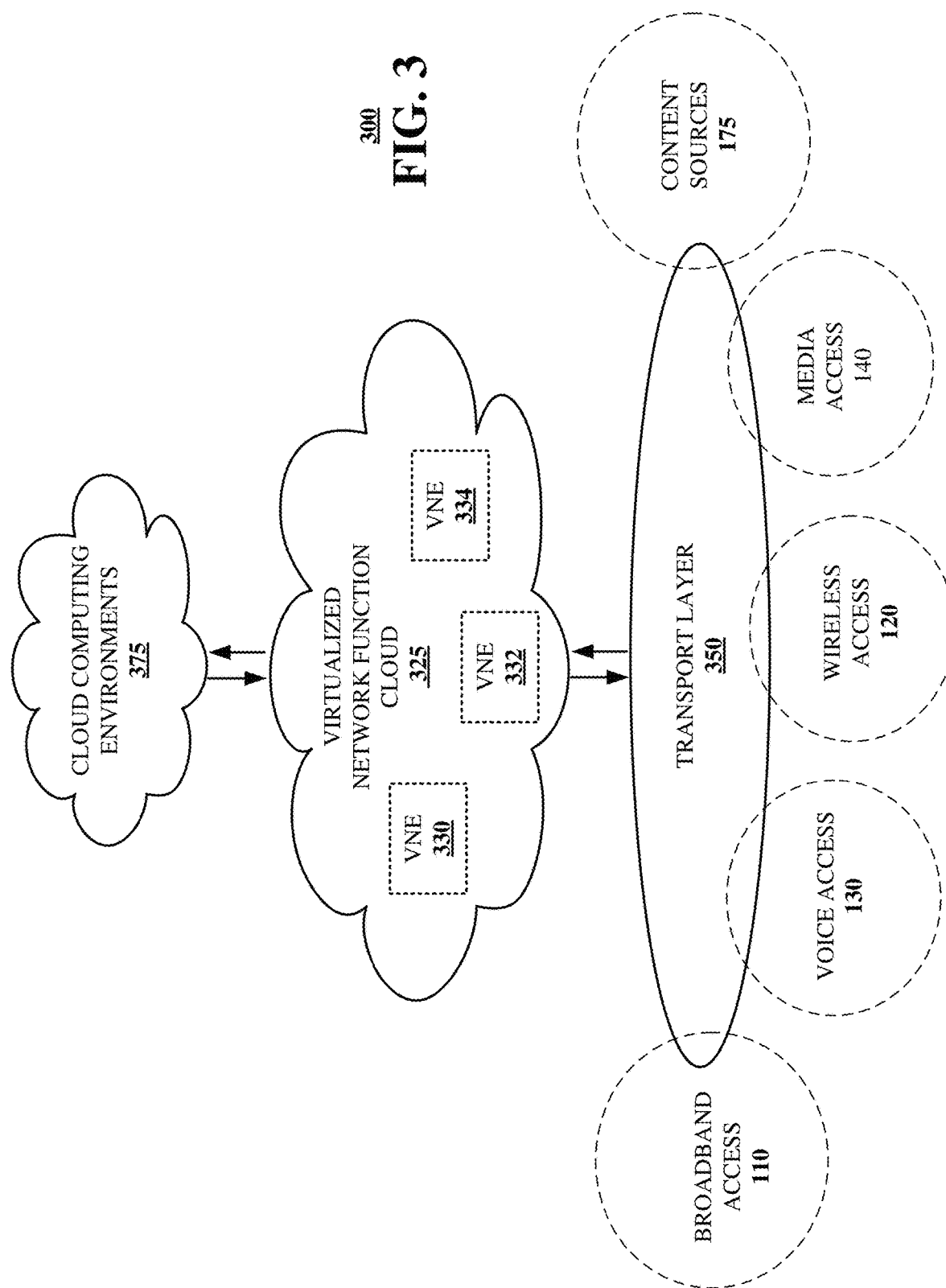

METHODS, SYSTEMS, AND DEVICES FOR PROVIDING A USER EXPERIENCE ASSOCIATED WITH A PAUSE IN PRESENTING MEDIA CONTENT

FIELD OF THE DISCLOSURE

The subject disclosure relates to methods, system, and devices for providing a user experience associated with a pause in presenting media content.

BACKGROUND

In the current state of the art, media content can be paused on a communication device associated with a user, albeit from a user initiating the pause, or when a streaming video pauses in the event of an empty buffer. Further, a user may pause content for various reasons (local distractions, not engaged, sensitive material, looking for additional information, etc.). In the event that media content is paused, an arbitrary frame or scene from the media content can be displayed on the communication device during the pause.

BRIEF DESCRIPTION OF THE DRAWINGS

Reference will now be made to the accompanying drawings, which are not necessarily drawn to scale, and wherein:

FIGS. 2A-2J are block diagrams illustrating example, non-limiting embodiments of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
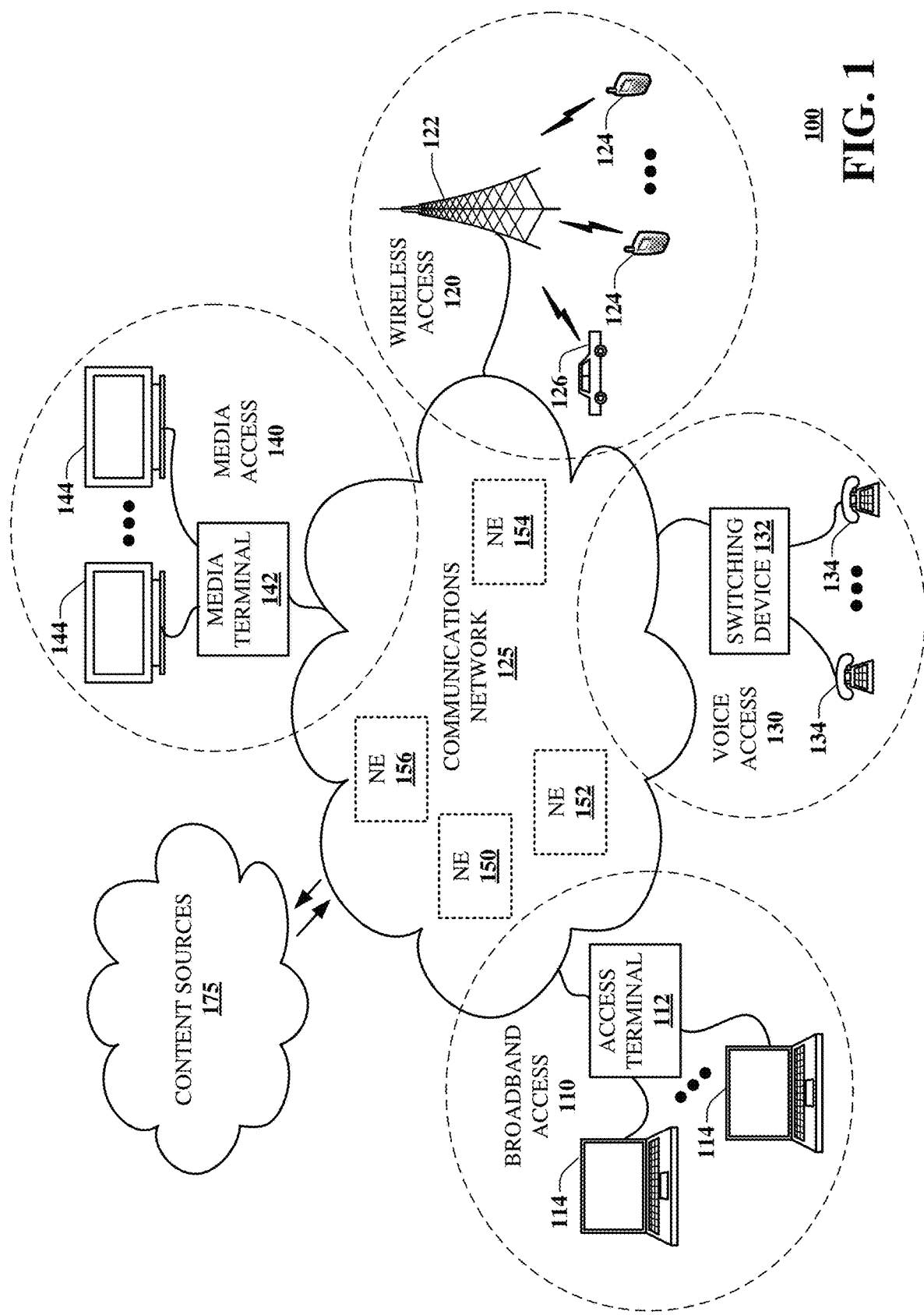
FIG. 1 is a block diagram illustrating an exemplary, non-limiting embodiment of a communications network in accordance with various aspects described herein.

The subject disclosure describes, among other things, illustrative embodiments for providing media content to a communication device. The communication device provides a playback of a presentation of the media content. Further embodiments can include receiving an indication from the communication device that indicates a pause in the presentation of the media content, and determining a plurality of attributes associated with the pause. Additional embodiments can include providing instructions according to the plurality of attributes associated with the pause to the communication device. Other embodiments are described in the subject disclosure.

One or more aspects of the subject disclosure include a device, comprising: a processing system including a processor, and a memory that stores executable instructions that, when executed by the processing system, facilitate performance of operations. The operations can comprise providing media content to a communication device. The communication device provides a playback of a presentation of the media content. Further operations can comprise receiving an indication from the communication device that indicates a pause in the presentation of the media content, and determining a plurality of attributes associated with the pause. Additional operations can comprise providing instructions according to the plurality of attributes associated with the pause to the communication device.

One or more aspects of the subject disclosure include a machine-readable medium, comprising executable instructions that, when executed by a processing system including a processor, facilitate performance of operations. The operations can comprise providing media content to a communication device. The communication device provides a playback of a presentation of the media content. Further operations can comprise receiving an indication from the communication device that indicates a pause in the presentation of the media content, and determining a plurality of attributes associated with the pause. Additional operations can comprise providing instructions according to the plurality of attributes associated with the pause to the communication device. The providing of the instructions comprises providing instructions to communication device to provide social media engagement regarding the media content to a user associated with the communication device.

One or more aspects of the subject disclosure include a method. The method can comprise providing, by a processing system including a processor, media content to a communication device. The communication device provides a playback of a presentation of the media content. Further, the method can comprise receiving, by the processing system, an indication from the communication device that indicates a pause in the presentation of the media content, and determining, by the processing system, a plurality of attributes associated with the pause. The determining of the plurality of attributes comprises determining a length of the pause. In addition, the method can comprise providing, by the processing system, instructions according to the plurality of attributes associated with the pause and the length of the pause to the communication device.

Referring now to FIG. 1, a block diagram is shown illustrating an example, non-limiting embodiment of a system 100 in accordance with various aspects described herein. For example, system 100 can facilitate in whole or in part determining attributes of a pause in media content presented on a communication device and transmitting instructions to the communication device to provide a user experience associated with the pause according to the attributes of the pause. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
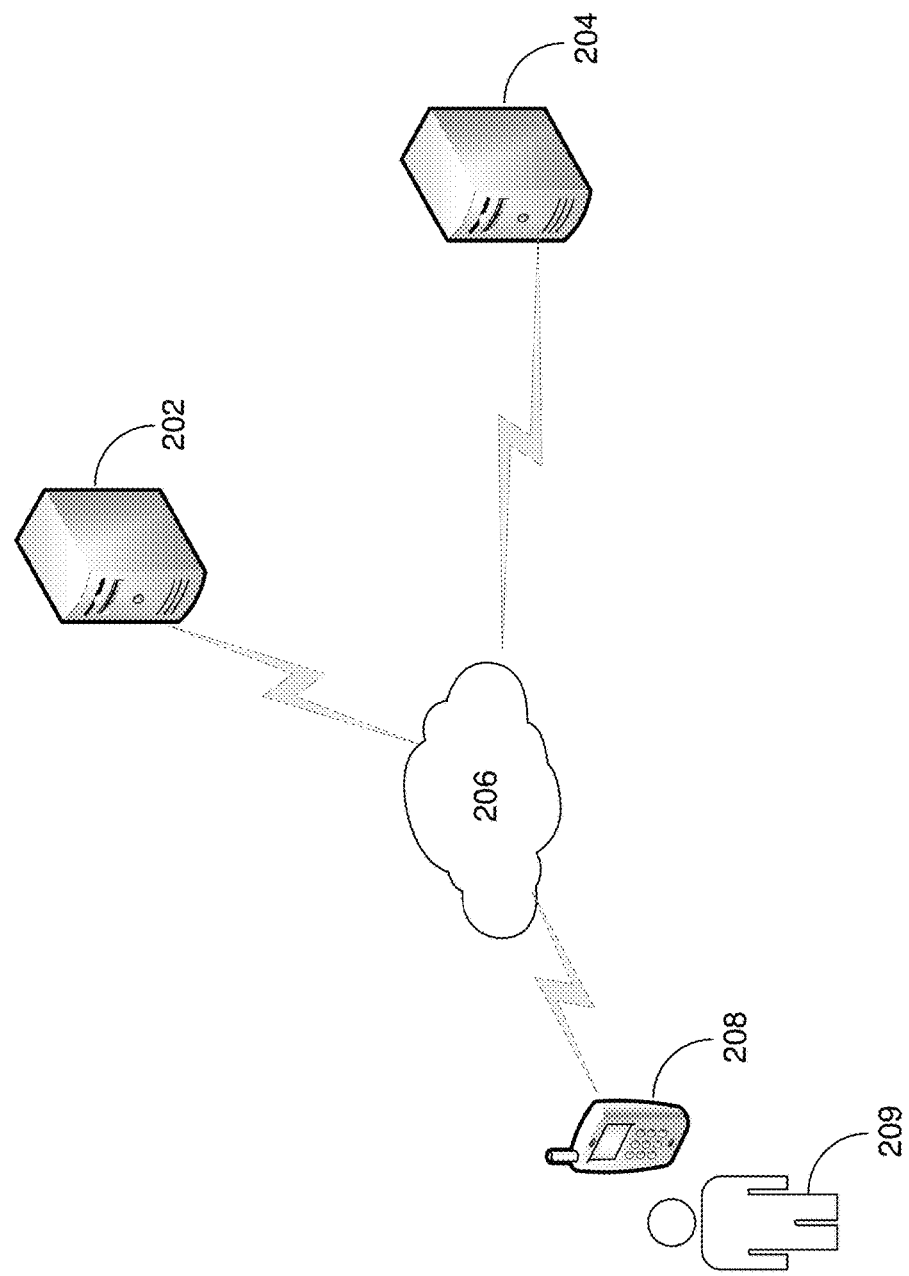

FIGS. 2A-2J are block diagrams illustrating example, non-limiting embodiments of a system functioning within the communication network of FIG. 1 in accordance with various aspects described herein. Referring to FIG. 2A, in one or more embodiments, a system 200 can include a media content server 202, an advertisement server 204, and a communication device 208 associated with user 209, all of which can be communicatively coupled to each other over a communication network 206. The communication network 206 can be a wireless communication network, a wired communication network, or a combination thereof. The communication device 208 can be a mobile device, a mobile phone, a smartphone, a tablet computer, a laptop computer, a desktop computer, a wearable device, an Internet-of-Things (TOT) device, navigation system, virtual reality device, augmented reality device, game console, set-top box with display, media processor with display, or any other computing device. The media content server 202 and advertisement server 204 can each be a server, a group of servers, a cloud server, one or more virtual servers, or several servers each of which implements some portion of the functions associated with media content server 202 and/or advertisement server 204.

In one or more embodiments, a communication device 208 can receive media content from media content server 202 over communication network 206. In some embodiments, this receipt of media content can be via streaming of the media content from the media content server 202 to the communication device 208. In other embodiments the media content can be downloaded from the media content server 202 to the communication device 208. In further embodiments, presentation of the media content on the communication device can be paused such that paused content can be displayed on the communication device. In some embodiments, paused content can be a frame, scene, or any portion of the media content that is being displayed when the pause occurs. In other embodiments, paused content can be content not within the media content but displayed by the communication device 208 during the pause such as an advertisement that the communication device 208 obtains over the communication network 206 from advertisement server 204, for example. The pause of the media content can be prompted by the user 209 by initiating a pause control (e.g., touching a pause icon on a graphical user interface of a touchscreen) on the communication device 208 or the pause of the media content can be unprompted due to an incoming phone call on the communication device 208, due to headphones becoming detached from the communication device 208, or due to an empty buffer when streaming media content is delayed in being received from the media content server 202.

In one or more embodiments, a user experience associated with the pause can be improved, for example, by selecting a different frame from a different point in the video (e.g., plus or minus a half second from the point in the video where the frame would ordinarily have been paused). For a further enhanced user experience, automated processing can be used to select a frame that is aesthetically more pleasing. Other examples of enhanced or improved user experiences may include visual summaries or auto-rewind if the length of the pause exceeds a time threshold. In other embodiments, the inclusion of external information (like social, factual, or location-specific details) can be used to enhance the experience associated with a pause if the user becomes engaged with one or more activities on the communication device. In additional embodiments, consumption of the media content both in home and while mobile may need more dynamic behavioral adjustments (from local sensors and environment sensors) to best accommodate the user's complex environment at hand.

In one or more embodiments, a system 200 can operate during a media content playback pause and can create an improved (dynamic) solution for the user experience during or associated with the pause. For example, adjusting the pause content during a pause can enhance or improve the user experience associated with the pause. In another example, rewinding the media content to a previous significant scene if the pause exceeds a time threshold to refresh user memory can also improve the user experience associated with the pause. In some embodiments, the system 200 can include dynamic pause solutions that incorporate user and content context as well as determine an action to take to begin and resume from a pause of media content to provide an enhanced user experience. In other embodiments, the system 200 can comprise inclusion of suggested and third-party solutions for pause content or resumption of media content after the pause that allows default (or preferred) media actions (play, rewind, etc.) as well as other information sources. Additional embodiments can include engagement and immersion sensitive adjustment that can find an improved resume point, and can bring in external information (e.g., actor information, product information, etc.) without leaving media content, possibly delaying delivery/inventory until user is engaged/available instead of blunt overlay on media content.

In one or more embodiments, the system 200 can implement a smart pause, which can be a concurrent, real-time reasoned solution for what to do/show a user 209 during a pause in media content that changes based on context and dwell time. Further embodiments can include supporting deeper engagement in the media content or a social media platform associated with the media content. Other embodiments can include an activity-based solution that includes determining if a user's local context was too loud or distraction. Additional embodiments can include an activity-based (in content) that includes re-watching the last meaningful event within the media content. Some embodiments can include time-based solution (e.g., send food coupon if around dinner during the pause of media content). Further embodiments can include a duration-based solution that can include determining length of the pause or the time to resume the media content and begin showing summary of the media content accordingly. Other embodiments can include a product-based solution that includes providing links of objects presented within the media content or based on brand placement. Some embodiments can include situation/audio observation that includes observing other people joining a room that displays the media content and then replaying media content based on eye gaze and sensor data, dead reckoning, etc. Additional embodiments include displaying other external events during the pause that can include amber alert, front door in response to doorbell, incoming phone call, etc. Further embodiments can include social inclusion (e.g., last tweets, social board inclusion, etc.) to stay in platform. Other embodiments can include recommender—additional content (related), or flagging it for sensitivity (e.g., adult/child filter addition, jump to end of scene).

In one or more embodiments, a media content server 202 can provide media content to communication device 208 over communication network 206. The communication device 208 can provide a playback of a presentation of the media content for the user 209. At some point, the presentation of the media content can be paused on the communication device 208. Further, the communication device 208 can provide and the media content server 202 can receive, over communication network 206, an indication that indicates the pause in the presentation of the media content. In addition, the indication can provide attributes regarding the pause. The indication can be a signal, message, notification, alert or any other indication. Also, the media content server 202 can determine or identify the attributes associated with the pause. Further, the media content server 202 can provide instructions to the communication device 208 over the communication network 206 according to the attributes associated with the pause. The instructions can be a signal, message, notification, alert or any other type of instructions The attributes can include the length of the pause, whether the pause was prompted by the user 209 or unprompted (e.g., by an incoming phone call, headphones disconnection, etc.), the scene of the media content at which it was paused, the pause content displayed to the user 209 by the communication device 208 during the pause, etc. Different instructions can be provided according to different attributes, some of which are discussed in conjunction with describing the figures herein. Further, different instructions can be sent to the communication device 208 from the media content server 202 for the same pause to provide different user experiences during the pause. In addition, different instructions can be sent to the communication device 208 from the media content server 202 for the different pauses to provide different user experiences during each of the different pauses.

Figure 2B:
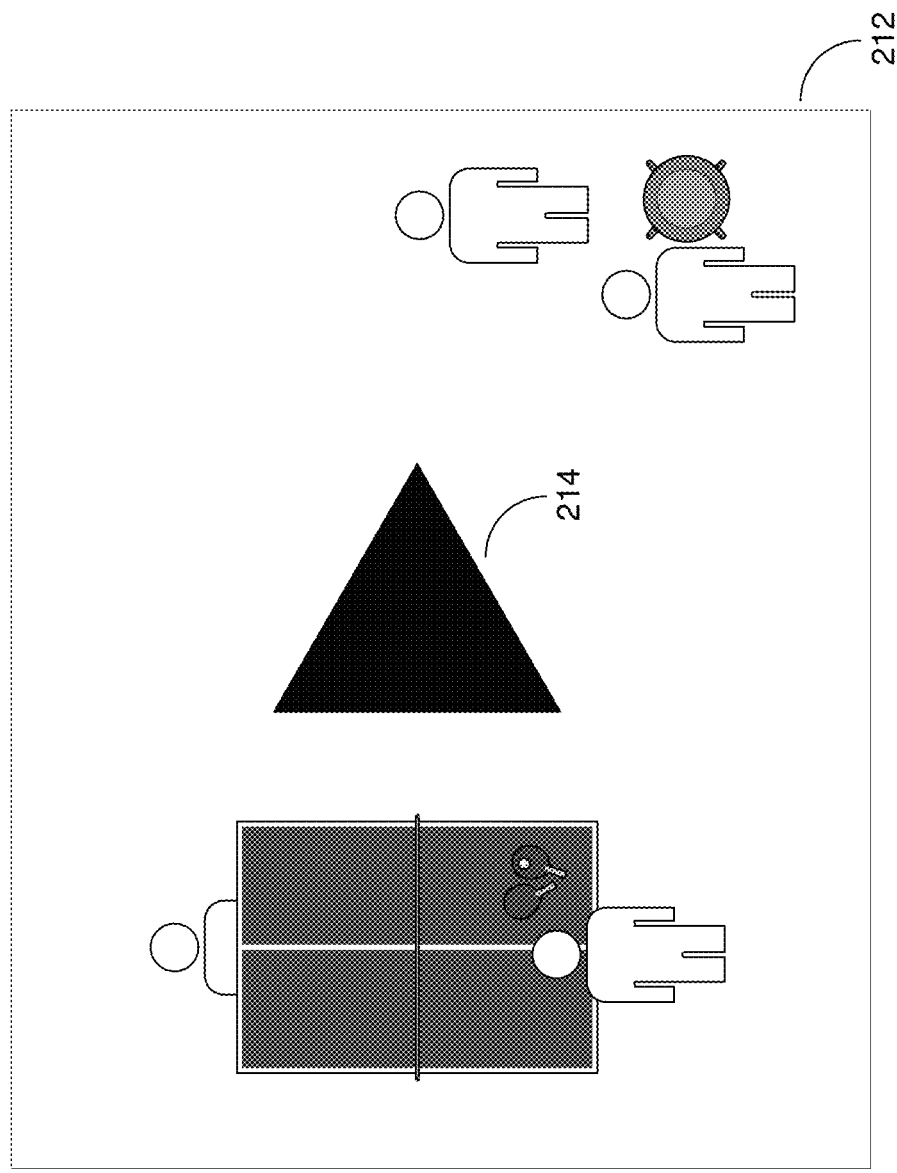

Referring to FIG. 2B, in one or more embodiments, a system 210 illustrates pause content 212, which can be a scene within media content presented on display of the communication device 208 to user 209. The display can be a touch screen such that a user can resume presentation of the media content by touching the play icon 214. The scene displayed as pause content 212 can be a group of people playing ping pong in a bar or restaurant. The communication device 208 can provide attributes of the pause that include indicating the scene of the pause content 212 to media content server 202. The media content server 202 can provide instructions to the communication device 208 that instruct it to obtain an advertisement related or associated with the content of the scene to be displayed as pause content 212.

Referring to FIG. 2C, in one or more embodiments, the communication device 208 can provide the subject matter of the scene displayed as pause content 212 to advertisement server 204 over communication network 206. Further, the advertisement server 204 can provide to communication device 208 over communication network 206 an advertisement related or associated with the scene displayed as pause content 212. In addition, the system 210*a* can show communication device 208 displaying advertisement 212*a* directed to a restaurant that offers ping pong as a recreational activity for the user. In some embodiments, the restaurant associated with the advertisement 212*a* can be located within a threshold distance of the location of the communication device 208. The user 209 can resume the media content by pressing the play icon 214*a* displayed on the touch screen of the communication device 208 during presentation of the advertisement 212*a*.

Figure 2D:
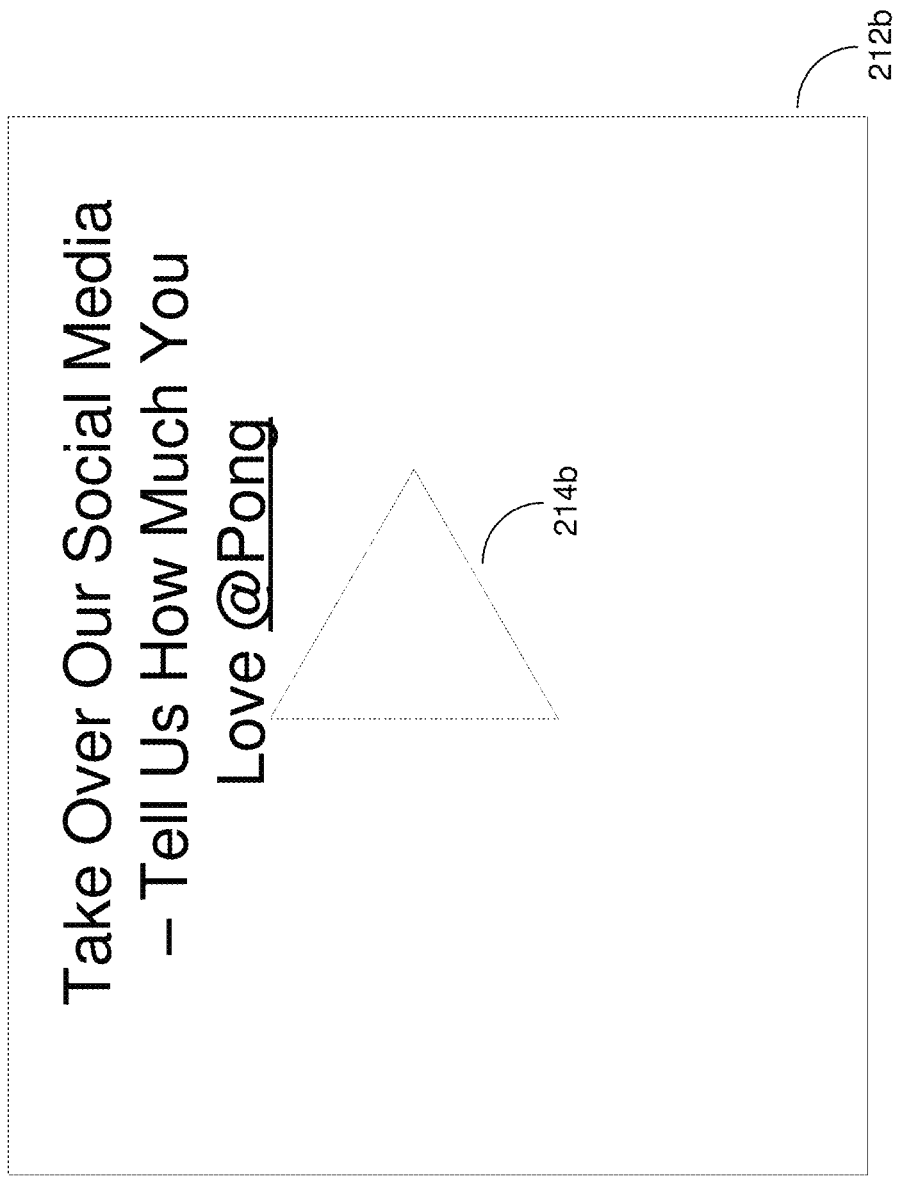

Referring to FIG. 2D, in one or more embodiments, the media content server 202 can provide instructions according to the attributes associated with the pause content 212 that encourage the user 209 to engage in social media with an entity related or associated with the scene displayed as pause content 212. For example, the communication device 208 can determine that the subject matter of the scene of the displayed pause content can be related or associated with a restaurant or bar offering ping pong as a recreational activity. Further, the communication device 208 can determine from the user's social media history that the user 209 recently visited a local restaurant offering ping pong as a recreational activity. Thus, system 210*b* shows that the communication device 208 can display a message 212b as pause content that encourages the user 209 to engage in social media regarding the local restaurant and can provide a link to the user 209 in the message 212b to a social media platform to start engaging in social media. The user 209 can resume the media content by pressing the play icon 214b displayed on the touch screen of the communication device 208 during presentation of the message 212b.

Figure 2E:
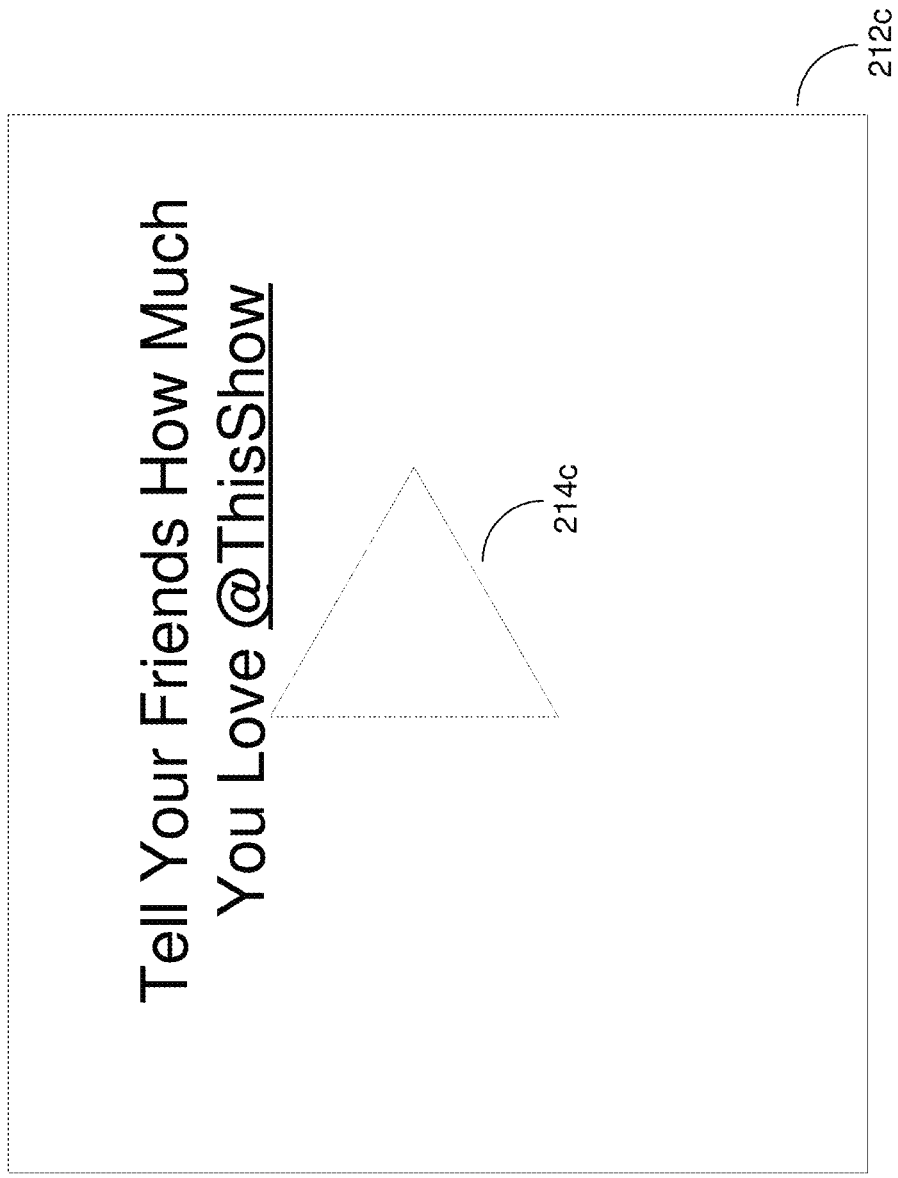

Referring to FIG. 2E, in one or more embodiments, the media content server 202 can provide instructions according to the attributes associated with the pause content 212 that encourage the user 209 to engage in social media related or associated with the media content that was paused. For example, the communication device 208 can determine that the subject matter of the scene of the displayed pause content can be related or associated with a restaurant or bar offering ping pong as a recreational activity. Thus, system 210c shows that the communication device 208 can display a message 212c as pause content that encourages the user 209 to engage in social media regarding the media content that was paused and can provide a link to the user 209 in the message 212c to a social media platform to start engaging in social media to discuss the media content. The user 209 can resume the media content by pressing the play icon 214c displayed on the touch screen of the communication device 208 during presentation of the message 212c.

Figure 2F:
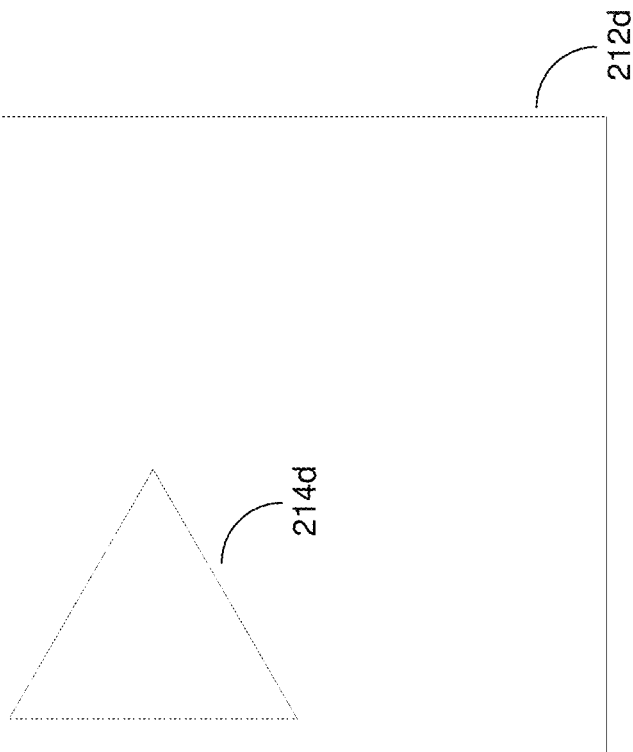

Referring to FIG. 2F, in one or more embodiments, one of the pause attributes can be the length of the pause. Further, the media content server 202 can determine the length of the pause and if it exceeds a threshold, the media content server 202 can provide instructions to the communication device 208 according to the length of the pause. The instructions can indicate to the communication device 208 to provide a summary of the media content that has been paused. The communication device 208 can provide pause content 212d that includes a message. Further, the message can include a link to the summary of the media content. The link can be presented on the touch screen of the communication device 208, when pressed by the user 209, can present the summary that is stored on the communication device 208 or can present the summary in an internet browser application on the communication device 208 where the summary is stored at, and downloaded from, the media content server 202 or some other server. The user 209 can resume the media content by pressing the play icon 214d displayed on the touch screen of the communication device 208 during presentation of the message as pause content 212d.

Figure 2G:
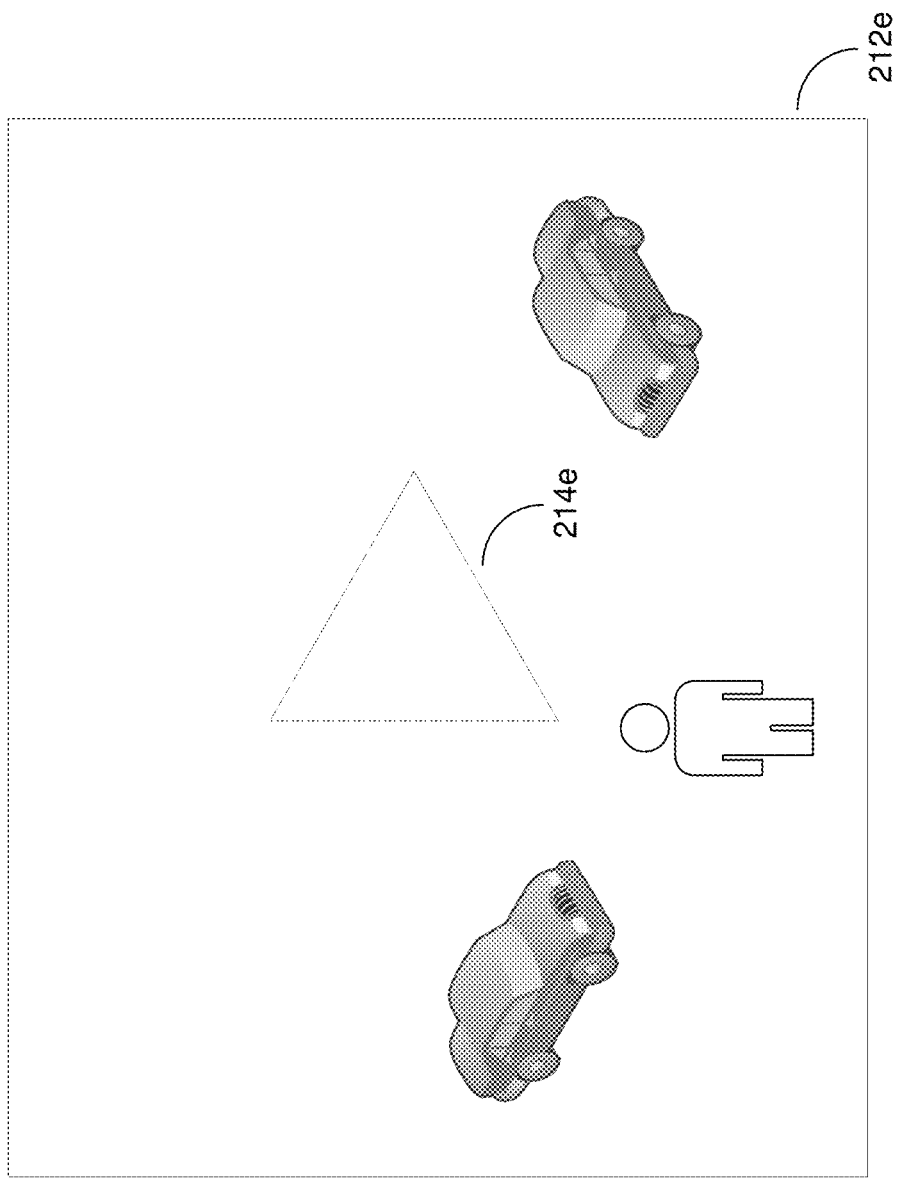

Referring to FIG. 2G, in one or more embodiments, one of the pause attributes can be the length of the pause. Further, the media content server 202 can determine the length of the pause and if it exceeds a threshold, the media content server 202 can provide instructions to the communication device 208 according to the length of the pause. The instructions can indicate to the communication device 208 to display a previous scene within the media content such that when the media content is resumed, the memory of the user 209 can be refreshed to the contents (e.g., subject matter, plot, etc,) of the media content. The previous scene can be selected based on a function (linear, nonlinear, exponential, combination thereof, etc.) the length of the pause. For example, if the length of the pause is five minutes, a previous scene can be selected one minute prior to the pause. However, the if the length of the pause is 24 hours then a previous scene can be selected five minutes prior to the pause. The communication device 208 can provide the selected previous scene as pause content 212e. The user 209 can resume the media content by pressing the play icon 214e displayed on the touch screen of the communication device 208 from the previous scene displayed as pause content 212e.

Referring to FIG. 2H, in one or more embodiments, the attributes associated with the pause can determine whether the pause was prompted or unprompted. A pause prompted by the user 209 can include the user 209 initiating the pause of media content. An unprompted cause includes an incoming telephone call into the communication device 208 or if the user 209 was listening to the media content through headphones and the headphones were disconnected from the communication device 208. In some embodiments, the unprompted cause of the pause can result in the pause content 212f being continued to be displayed on the communication device 208, for example, when the user uses a speaker to conduct a telephone call. Further, the communication device 208 can be stationary and not moving, indicating the user 209 may be viewing the pause content 212f. Thus, the communication device can display a visual advertisement (e.g., the significant components of the advertisement are visual). That is, the communication device 208 can adjust the pause content from pause content 212 that includes a scene of the media content to pause content 212f that includes a visual advertisement based on the unprompted cause of the pause and/or that the communication device is stationary. The user 209 can resume the media content by pressing the play icon 214e displayed on the touch screen of the communication device 208.

Figure 2I:
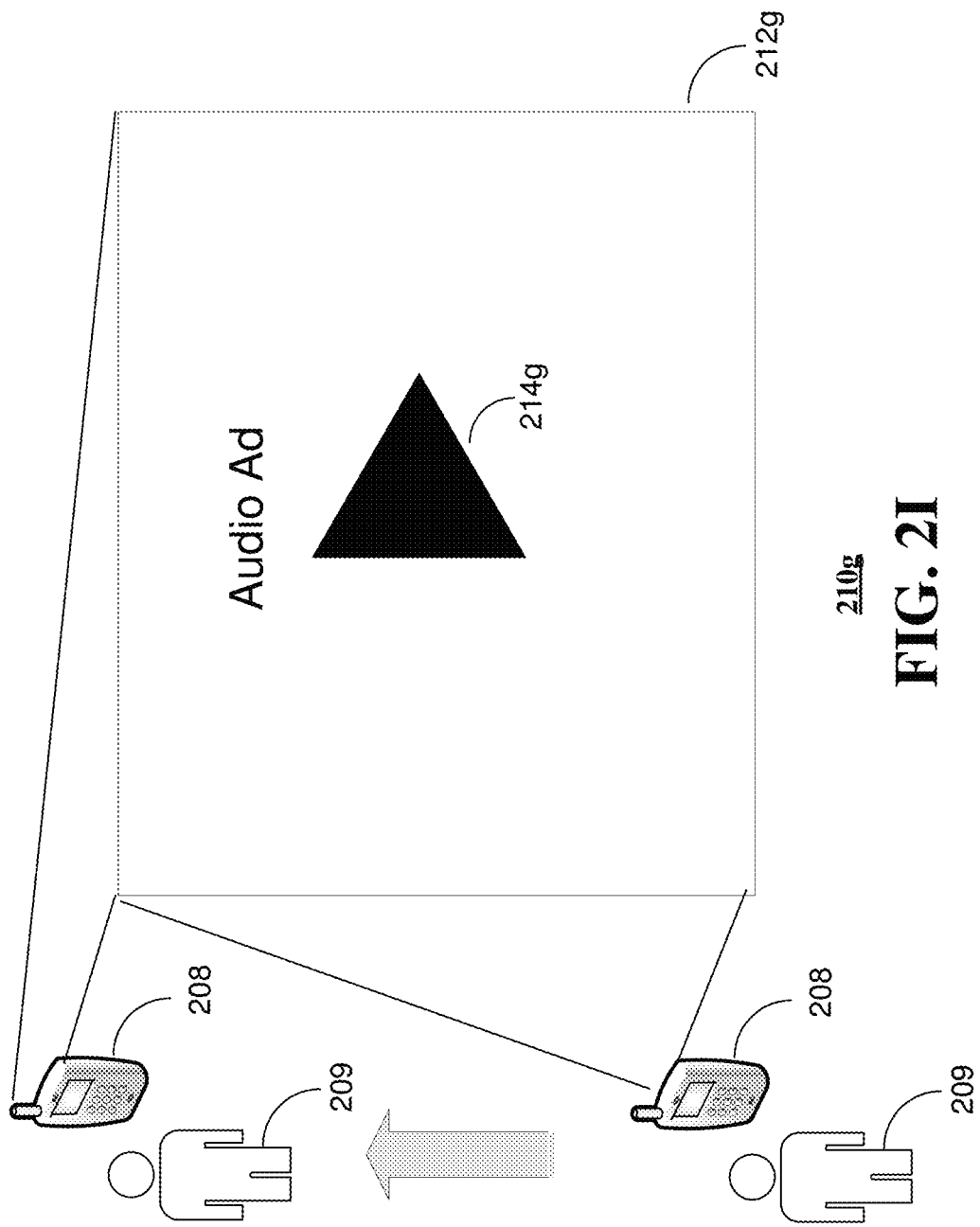

Referring to FIG. 2I, in one or more embodiments, the attributes associated with the pause can determine whether the pause was prompted or unprompted. A pause prompted by the user 209 can include the user 209 initiating the pause of media content. In some embodiments, the prompted cause of the pause can result in the pause content 212f such that the user 209 is not viewing the pause content but can still may be able to hear or listen to the pause content. For example, the communication device 208 can be detected to moving as shown in FIG. 2I, indicating the user 209 may be not viewing the pause content 212g but can still listen to the pause content 212g. Thus, the communication device 208 can present an audio advertisement (e.g., the significant components of the advertisement are audio). That is, the communication device 208 can adjust the pause content from pause content 212 that includes a scene of the media content to pause content 212f that includes an audio advertisement based on the prompted cause of the pause and/or that the communication device is not stationary (both of which can be attributes of the pause). The user 209 can resume the media content by pressing the play icon 214f displayed on the touch screen of the communication device 208.

Figure 2J:
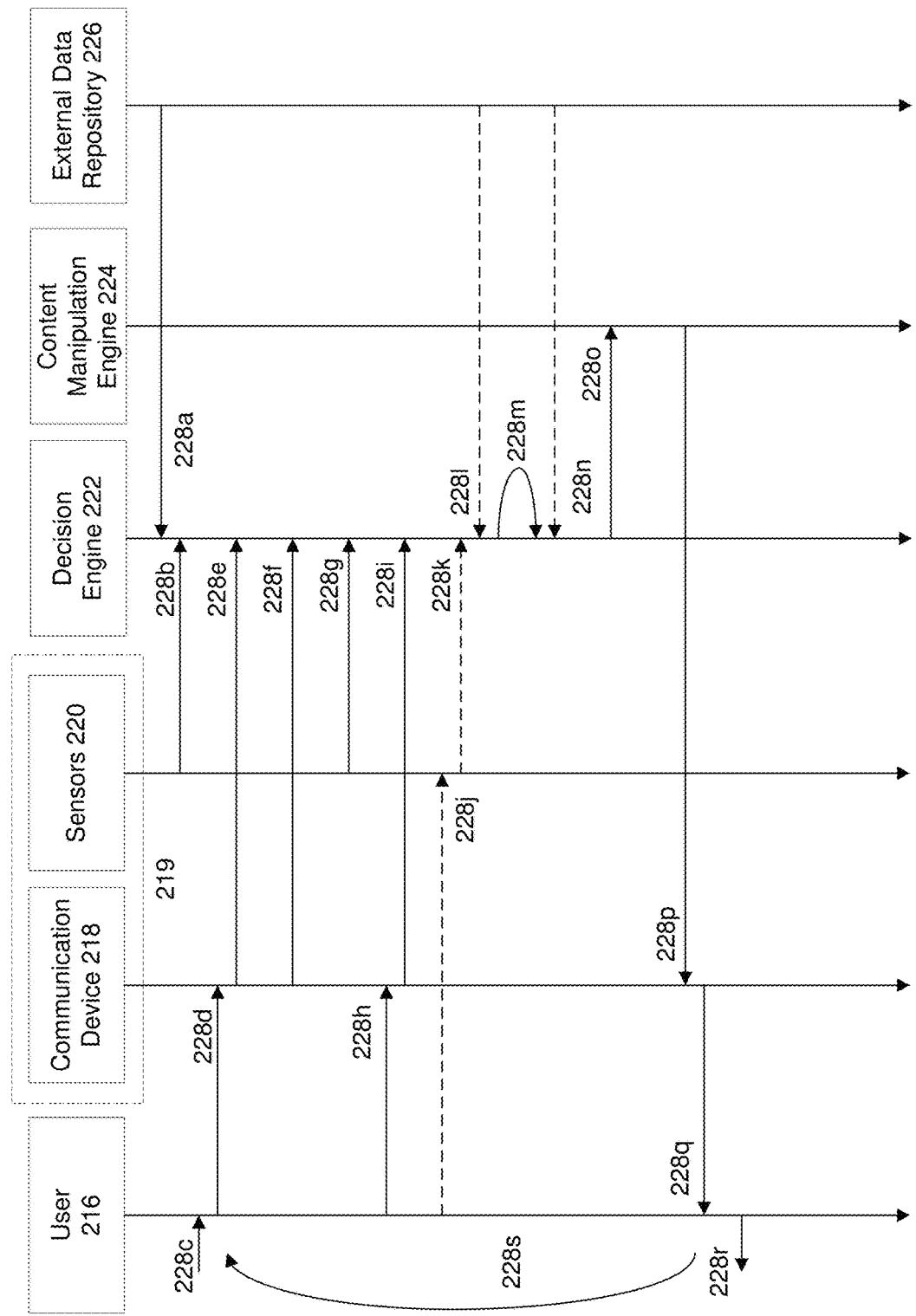

Referring to FIG. 2J, in one or more embodiments, the transition diagram of system 215 can include a user 216, an environment 219 that includes a communication device 218 and sensors 220, a decision engine 222 and a content manipulation engine 224 located in a media content server, and one or more external data repositories 226 can include advertisement server or social media servers. In some embodiments, the decision engine 222 and content manipulation engine 224 can be components of a media content server that include software and/or hardware. In other embodiments, the decision engine 222 and content manipulation engine 224 can components of another server or the communication device that include software and/or hardware. As shown in FIG. 2J, the decision engine 222 and content manipulation engine 224 can be implement portions of the method shown by the transition diagram.

In one or more embodiments, external data repositories 226 as part of an advertisement or social media marketplace that can implement default actions subscribe to the decision engine 222, at transition 228a. Further, the environment 219 that includes the communication device 218 and the sensors 220 may continuously feed or provide data to the decision engine 222, at transition 228b. In addition, the user 216 initiates a profile query, at transition 228c, when the user logs into system 215 using communication device 218 and consumes media content, at transition 228d. Consumption of media content can be indicated to the decision engine 222, at transition 228e. Further, behavioral information can be sent to decision engine 222 from communication device 218 and sensors 220, at transition 228f and transition 228g. In addition, the user can initiate or prompt a pause, at transition 228h. The pause can be indicated to the decision engine 222, at transition 228i. In some embodiments, the pause can be unprompted that can be detected by sensors, at 228j. An indication can be sent to the decision engine of the unprompted cause of the pause by the sensors 220, at transition 228k. In other embodiments, the unprompted cause of the pause can be triggered by an external interrupt, at transition 228l. Further, the decision engine 222 can continuously evaluate solutions with context of the paused media content and external data inputs, at transition 228m. In addition, the decision engine 222 can request external update for decision update, at 228n. The decision engine 222 can propose or render a solution to improve the user experience during the pause that can include manipulating current or future paused content to the content manipulation engine 224, at transition 228o. The content manipulation engine 224 can deliver new paused content to the communication device 218, at transition 228p. Further, the communication device 218 can present the new paused content to the user 216, at transition 228q. In addition, the communication device, in response to user input, can update a user profile, at transition 228r. Also, the user triggered action/ user input can be used in future profile queries, at transition 228s, That is, a same or similar type of solution can be provided to a user to improve a user experience as the current solution for a current set of pause attributes when pause attributes for a future pause are determined to be similar to the current set of pause attributes.

In one or more embodiments, the system 215 can pool potential smart advertisement solutions that includes bootstrapping pause point actions from user and content profile. Further embodiments can allow other external sources (and active systems) to associate themselves with pause points in specific content or activity (e.g., social media registering/ social lookup during pause, advertisement entity registering for ad placement during pause). In additional embodiments, location or environment may indicate some local services to recommend (e.g., stadium PoS, etc).

In one or more embodiments, a user logs into communication device 218 and begins consuming media content. Further, behavior and content can be analyzed during viewing of media content or prior to viewing. Such analysis can include pulling in metadata from media content (objects, people, violence, brand, etc.), sensors 220 for user 216 also give behavioral context such as user location, activity, possible biometrics, additional external sensors or devices connected to provide data, correlate external activity (go to website to lookup acronym) for future automatic suggestion for pause content.

In one or more embodiments, user or system can initiate a pause. In some embodiments, the pause can be an active pause, passive look away or detected attention fade. In other embodiments, the pause can be an active pause/stop, turn off device, update bookmark, notify other devices for later activity. In further embodiments, the pause can be passive interrupt from another process (door bell, phone call, additional speaker detected in room, etc.). In additional embodiments, the decision engine 222 can continuously evaluate system 215 for activity that can be used to adjust the pause content. This evaluation can include determining context of user by recent activity, deciding which activity/solution is most salient or helpful, offering possible inventory (banner, video, etc.) to advertisers for advertisement market (or simple activity fingerprint) for subsequent intender activity, and for in system-driven pause, the system 215 can delay external events or content events for better semantics (e.g., doorbell or phone call is incoming, but delayed until end of important scene/action). In some embodiments, the decision engine 222 can provide instructions to the communication device 218 to render of a pause solution. Rendering a pause solution can include. depending on dwell/delay, system 215 reevaluating or revisiting a decision by system 215 and pulling additional external information to be used to adjust the pause content. Further, the rendering of a pause solution can include blending the delivery of adjusted pause content into the current frame (e.g., AR/visual overlay into the content). In other embodiments, the user 216 can take some action from on-screen (or externally correlated device). In further embodiments, the communication device 218 can update user profile or content profile, models for behavioral state, etc.

In one or more embodiments, the adjusting of pause content can provide better user engagement with media content after the media content server chooses best hands-off activity, which can include replay, skip, other external activities, etc. Further, the adjusting of pause content can include better user engagement and content quality by providing best pause moment (e.g., scanning for non-blurry content or providing other summary/background info). In addition, with context knowledge, adjusting the pause content offers best solution for un-pause/resume, which may include advanced content manipulation or curation options. Also, the adjusting of pause content can provide an explicit opportunity for advertising or data lookup that includes using pause trigger, providing more relevant information for external activity where/when user is engaged. Further, the adjusting of pause content can include increased user safety by engaging and resuming content without requiring explicit user input (e.g. no touch, no break from their other activity). In addition, the adjusting of pause content can comprise brand and content safety including content analysis, can skip, summarize, or modify objectionable content during pause based on user interaction and social context.

Figure 2K:
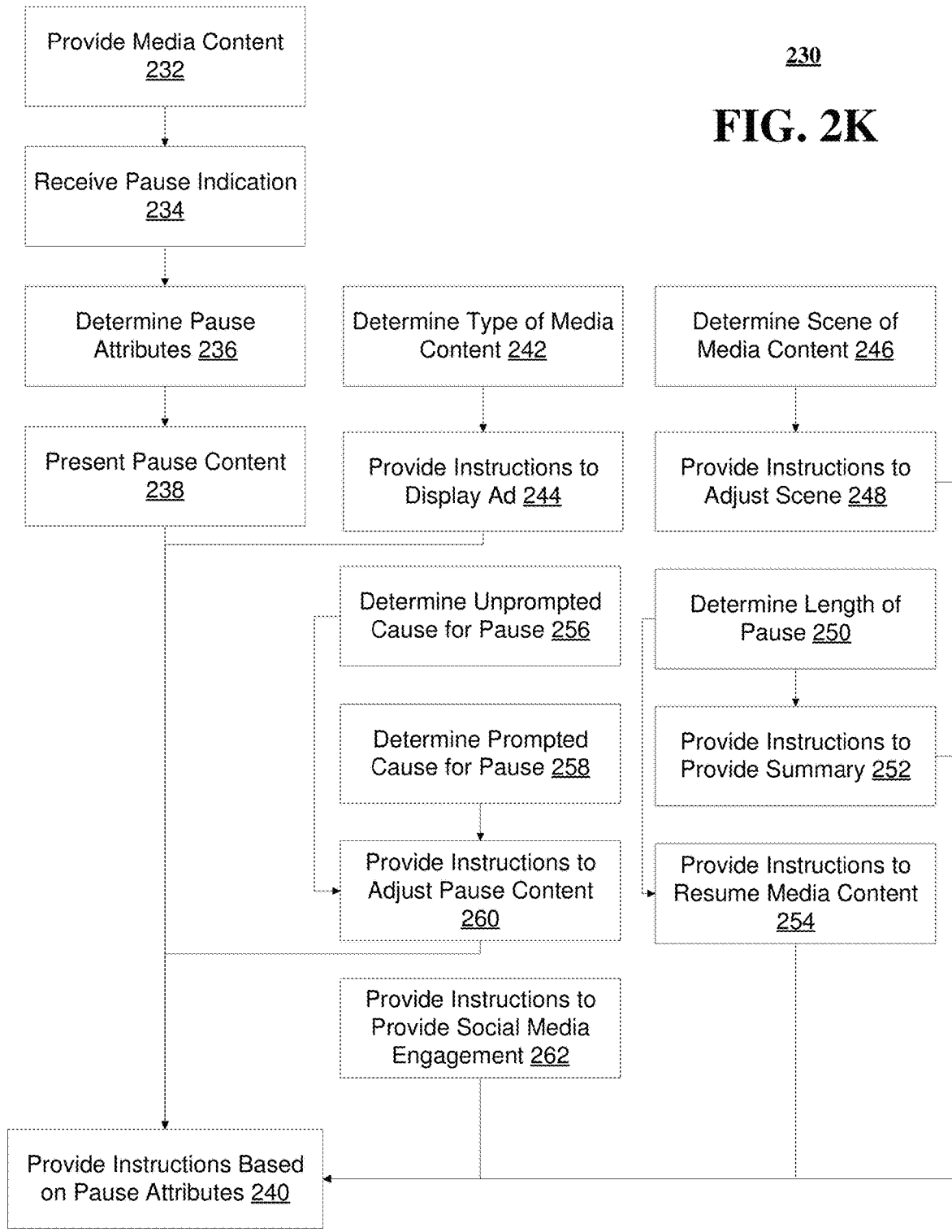
FIG. 2K depicts an illustrative embodiment of a method in accordance with various aspects described herein.

In one or more embodiments, adjusting the pause content can incorporate additional ad/inventory addressable solutions such as product placement in the pause content or other immersion strategies for paused content. In addition, the adjusting of pause content can include implementing style transfer logic to transition ad creative to local content (from more generic message of text, visual, etc.). Adjusting of the pause content can include advanced pause solutions to improve the user experience that can be populated just-in-time from user's context (e.g. in car, have car controls; in stadium, have PoS completion). These can be guided actions that can be taken while still in the content footprint. The adjusting of pause content can include allowing additional external events to trigger a pause (and correlate reason) to the on-screen content (e.g. pizza delivery that was requested has arrived, pause can interrupt and show why/what is done, etc.). Also, the adjusting of pause content can include enablement and scene text that includes using pause moment detection, and allowing other external interrupts (like machine-generated scene text (a descriptive service for activity)) to be delayed or cause a delay in playback or interrupt. Further, the adjustment of pause content can take into account brand sponsorship such that additional pause solutions allow closer review of sponsored brand or zoom in of visual artifact. In addition, the adjustment of pause content can be made to facilitate inserting or overlaying an ad or brand logo into the media (e.g., pause content), such as selecting a video frame containing a blank wall or a uniform area such as sky FIG. 2K depicts an illustrative embodiment of a method in accordance with various aspects described herein. In one or more embodiments, aspects of the method 230 can be performed by a media content server or a communication device. Further, some function described herein to be implemented by the media content server can be implemented by the communication device. The method 230 can include the media content server, at 232, providing media content to a communication device. The communication device provides a playback of a presentation of the media content. Further, the method 230 can include the media content server, at 234, receiving an indication from the communication device that indicates a pause in the presentation of the media content. The indication can also indicate a plurality of attributes associated with the pause. In addition, the method 230 can include the media content server, at 236, determining or identifying the plurality of attributes associated with the pause. Also, the method 230 can include the communication device, at 238, presenting pause content during the pause. The method 230 can include the media content server, at 240, providing instructions according to the plurality of attributes associated with the pause to the communication device.

In one or more embodiments, the method 230 can include the media content server, at 242, determining a type of content of the media content prior to the pause within the media content. In some embodiments, the determining of the plurality of attributes comprises determining a type of content of the media content prior to the pause within the media content. Further, the method 230 can include the media content server, at 244, providing instructions to the communication device to display an advertisement during the pause according to the type of content. In other embodiments, the providing of the instructions comprises providing instructions to the communication device to display the advertisement during the pause according to the type of content.

In one or more embodiments, the method 230 can include the media content server, at 246, determining a scene of the media content presented during the pause. In further embodiments, the determining of the plurality of attributes comprising determining a scene of the media content presented during the pause. Also, the method 230 can include the media content server, at 248, providing instructions to the communication device to adjust the scene presented during the pause. In additional embodiments, the providing of the instructions comprise providing instructions to the communication device to adjust the scene presented during the pause.

In one or more embodiments, the method 230 can include the media content server, at 250, determining a length of the pause. Further, the method 230 can include the media content server, at 252, providing instructions to the communication device to provide a summary of the media content prior to resuming the media content after the pause based on the length of the pause. In some embodiments, the providing of the instructions comprises providing instructions to the communication device to provide a summary of the media content prior to resuming the media content after the pause based on the length of the pause. In addition, the method 230 can include the media content server, at 254, providing instructions to the communication device resume the media content to a time period prior to the pause, the time period is based on the length of the pause. In other embodiments, the providing of the instructions comprises providing instructions to the communication device resume the media content to a time period prior to the pause, the time period is based on the length of the pause.

In one or more embodiments, the method 230 can include the media content server, at 256, determining an unprompted cause of the pause. In some embodiments, the determining of the plurality of attributes comprises determining an unprompted cause of the pause. Further, the method 230 can include the media content server, at 258, determining a prompted cause of the pause. In other embodiments, the determining of the plurality of attributes comprises determining a prompted cause of the pause. In addition, the method 230 can include the media content server, at 260, providing instructions to adjust the pause content based on the prompted cause or the unprompted cause. In additional embodiments, the providing of the instructions comprises providing instructions to adjust the pause content based on the prompted cause or unprompted cause. Also, the method 230 can include the media content server, at 262, providing instructions to the communication device to provide social media engagement regarding the media content to a user associated with the communication device. In further embodiments, the providing of the instructions comprises providing instructions to the communication device to provide social media engagement regarding the media content to a user associated with the communication device. The communication device comprises one of a set-top box, mobile device, wearable device, virtual reality device, augmented reality device, or combination thereof.

Further, the media content server can provide several different instructions to provide different pause content or different user experiences during the same pause or provide different pause content or different user experiences during different pauses of the media content.

While for purposes of simplicity of explanation, the respective processes are shown and described as a series of blocks in FIG. 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Portions of embodiments can be combined with portion of other embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200, 210, 210a-210g, 215, and method 230 presented in FIGS. 1, 2A-2J, and 3. For example, virtualized communication network 300 can facilitate in whole or in part determining attributes of a pause in media content presented on a communication device and transmitting instructions to the communication device to provide a user experience associated with the pause according to the attributes of the pause.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
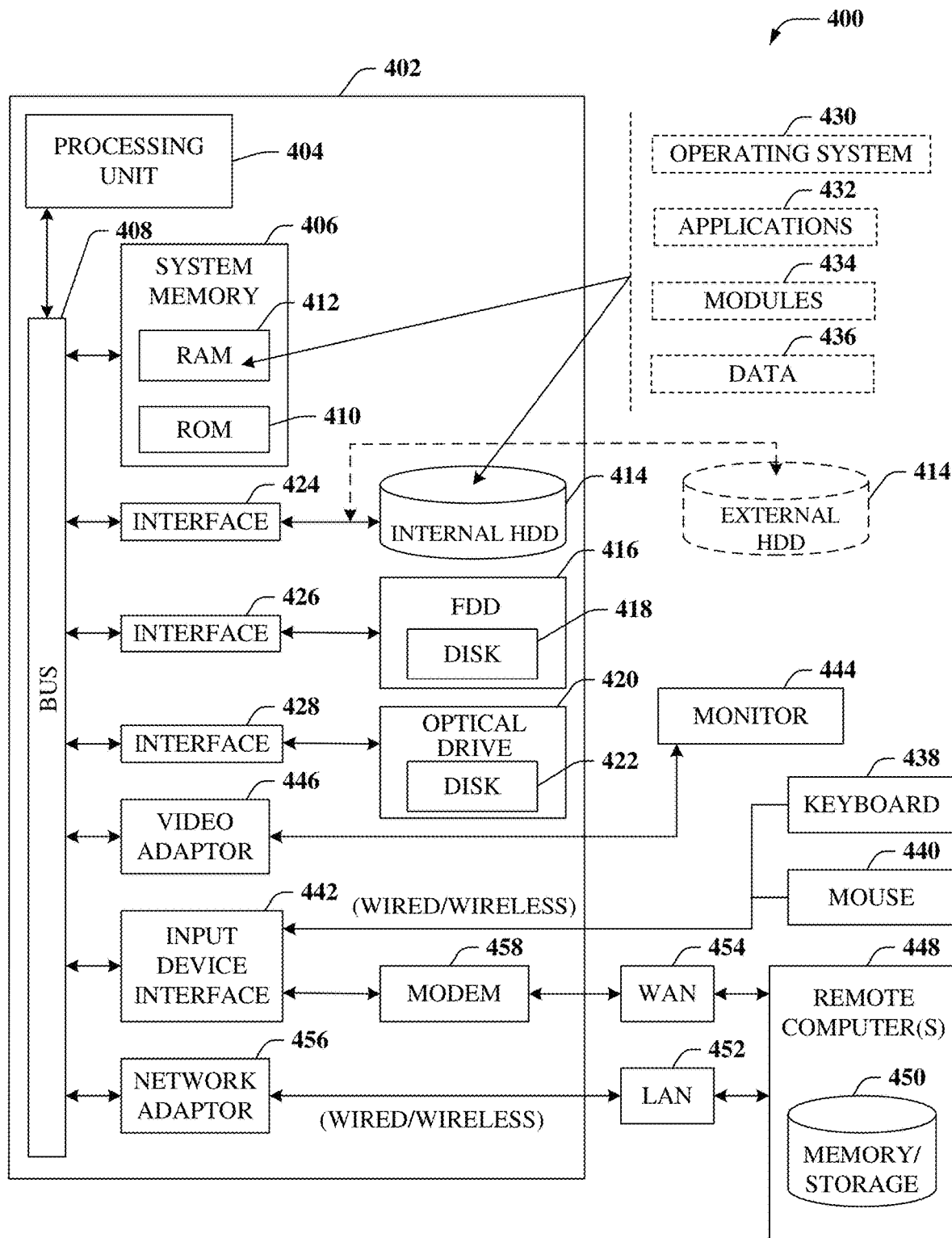
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining attributes of a pause in media content presented on a communication device and transmitting instructions to the communication device to provide a user experience associated with the pause according to the attributes of the pause. Further, the servers and communication devices described herein comprise a computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
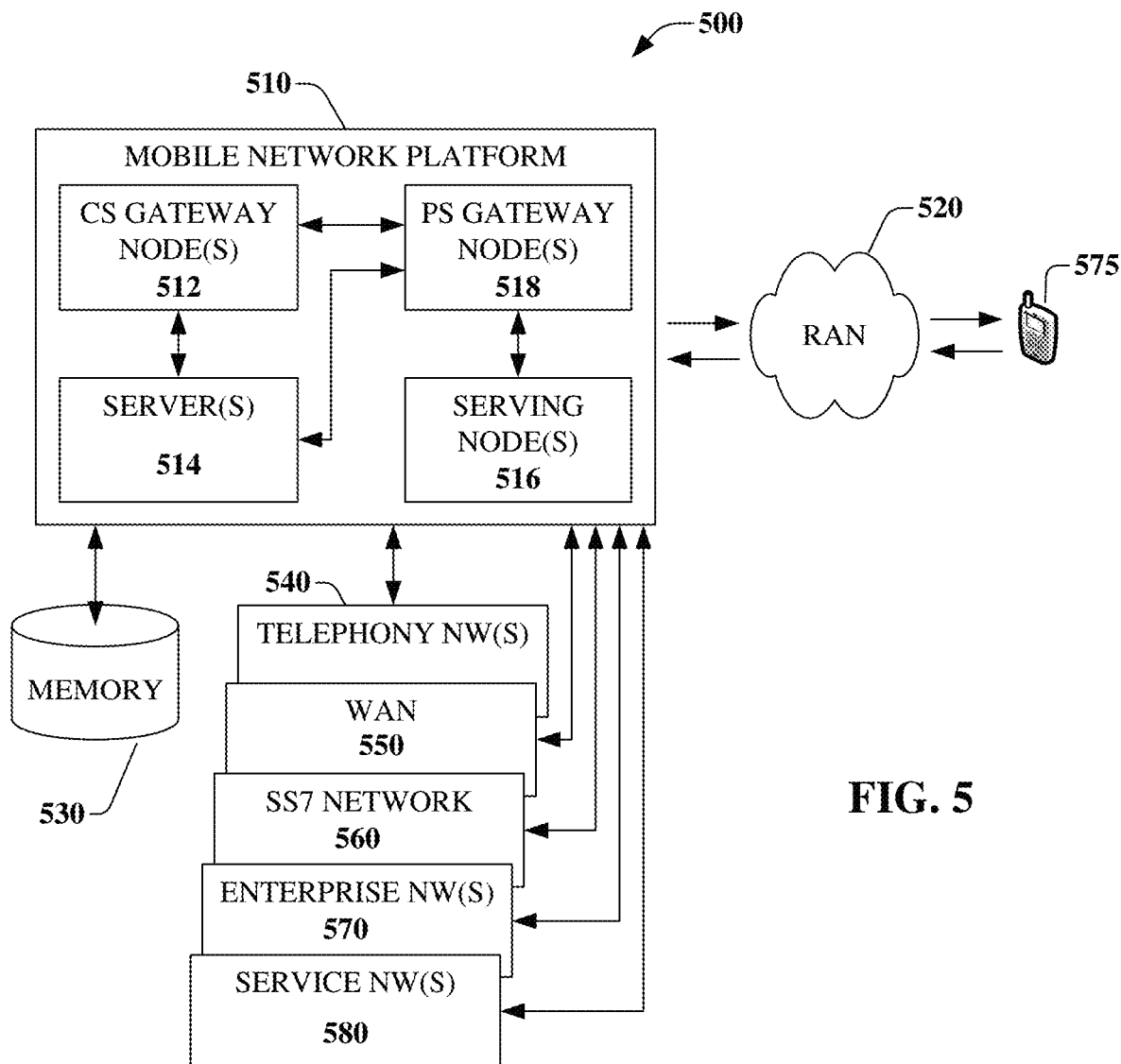
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining attributes of a pause in media content presented on a communication device and transmitting instructions to the communication device to provide a user experience associated with the pause according to the attributes of the pause. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
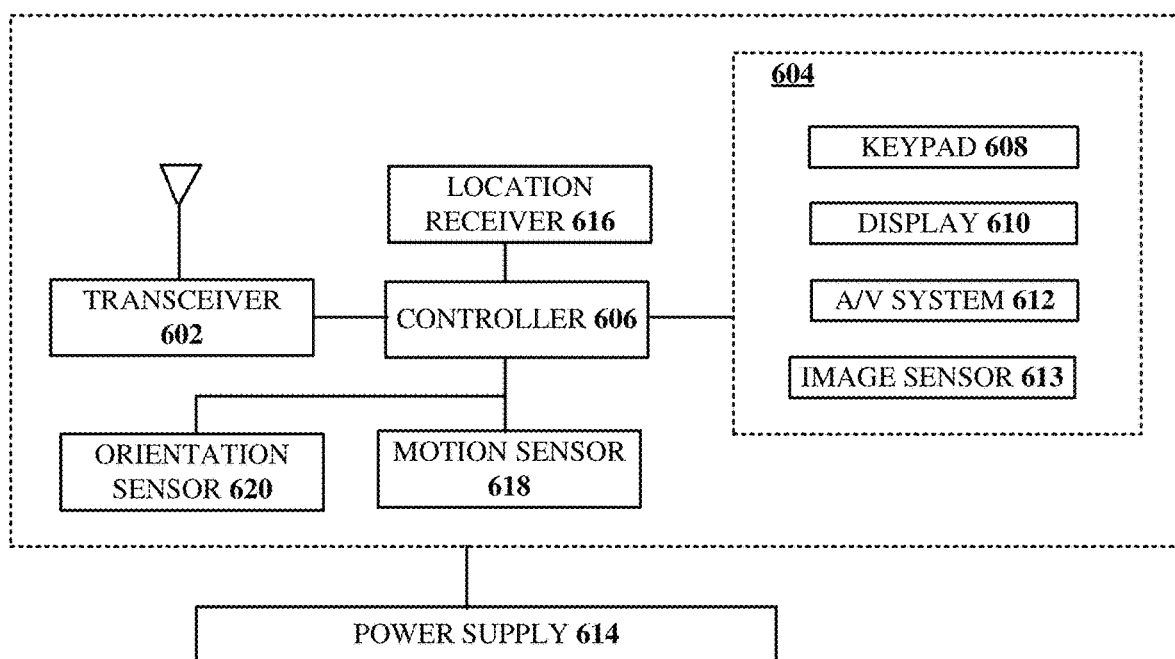
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part determining attributes of a pause in media content presented on a communication device and transmitting instructions to the communication device to provide a user experience associated with the pause according to the attributes of the pause. Further, the servers and communication devices described herein comprise a communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600.

In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   providing media content to a communication device, wherein the communication device provides a playback of a presentation of the media content;
   receiving an indication from the communication device that indicates a pause in the presentation of the media content;
   determining a plurality of attributes associated with the pause, wherein the determining of the plurality of attributes comprises determining a length of the pause;
   determining that the length of the pause exceeds a threshold;
   determining that the communication device is stationary;
   determining that at least one person has joined a room in which the presentation of the media content is displayed, and determining an eye gaze of the at least one person; and
   providing instructions according to the plurality of attributes associated with the pause to the communication device, wherein the providing of the instructions comprises:
   responsive to the determining that the length of the pause exceeds the threshold, and responsive to the determining that at least one person has joined the room, instructing the communication device to provide a summary of the media content, based at least in part on the eye gaze of the at least one person; and
responsive to the determining that the communication device is stationary, instructing the communication device to display a visual advertisement.

2. The device of claim 1, wherein the determining of the plurality of attributes further comprises determining a type of content of the media content prior to the pause within the media content, and wherein the providing of the instructions further comprises providing instructions to the communication device to display a first pause content during the pause according to the type of content, and to modify the first pause content to include the visual advertisement and to recommend additional content when the communication device is determined to be stationary.

3. The device of claim 1, wherein the determining of the plurality of attributes further comprises determining a scene of the media content presented during the pause, wherein the providing of the instructions comprises providing instructions to the communication device to adjust the scene presented during the pause, wherein the providing instructions to adjust the scene comprises providing instructions to include social media, amber alerts, and front door notifications in response to a doorbell.

4. The device of claim 1, wherein the providing of the instructions further comprises:
responsive to the determining that the length of the pause exceeds the threshold, providing instructions to the communication device to resume the media content to a time period prior to the pause.

5. The device of claim 1, wherein the communication device presents pause content during the pause.

6. The device of claim 5, wherein the determining of the plurality of attributes further comprises determining an unprompted cause of the pause, and wherein the providing of the instructions further comprises providing instructions to adjust the pause content based on the unprompted cause.

7. The device of claim 5, wherein the determining of the plurality of attributes further comprises determining a prompted cause of the pause, and wherein the providing of the instructions further comprises providing instructions to adjust the pause content based on the prompted cause.

8. The device of claim 1, wherein the providing of the instructions further comprises providing instructions to the communication device to provide social media engagement regarding the media content to a user associated with the communication device.

9. The device of claim 1, wherein the communication device comprises one of a set-top box, media processor, mobile device, wearable device, virtual reality device, augmented reality device, or combination thereof.

10. A non-transitory, machine-readable medium, comprising executable instructions that, when executed by a processing system including a processor, facilitate performance of operations, the operations comprising:
providing media content to a communication device, wherein the communication device provides a playback of a presentation of the media content;
receiving an indication from the communication device that indicates a pause in the presentation of the media content;
determining a plurality of attributes associated with the pause, wherein the determining of the plurality of attributes comprises determining a length of the pause;
determining that the length of the pause exceeds a threshold;
determining that the communication device is stationary;
determining that at least one person has joined a room in which the presentation of the media content is displayed, and determining an eye gaze of the at least one person; and
providing instructions according to the plurality of attributes associated with the pause to the communication device, wherein the providing of the instructions comprises:
providing instructions to the communication device to provide social media engagement regarding the media content to a user associated with the communication device;
responsive to the determining that the length of the pause exceeds the threshold, and responsive to the determining that at least one person has joined the room, instructing the communication device to provide a summary of the media content, based at least in part on the eye gaze of the at least one person; and
responsive to the determining that the communication device is stationary, instructing the communication device to display a visual advertisement.

11. The non-transitory, machine-readable medium of claim 10, wherein the providing of the instructions further comprises:
responsive to the determining that the length of the pause exceeds the threshold, providing instructions to the communication device to resume the media content to a time period prior to the pause.

12. The non-transitory, machine-readable medium of claim 10, wherein the communication device presents pause content during the pause.

13. The non-transitory, machine-readable medium of claim 12, wherein the determining of the plurality of attributes further comprises determining an unprompted cause of the pause, and wherein providing of the instructions further comprises providing instructions to adjust the pause content based on the unprompted cause.

14. The non-transitory, machine-readable medium of claim 12, wherein the determining of the plurality of attributes further comprises determining a prompted cause of the pause, and wherein providing of the instructions further comprises providing instructions to adjust the pause content based on the prompted cause.

15. A method, comprising:
providing, by a processing system including a processor, media content to a communication device, wherein the communication device provides a playback of a presentation of the media content;
receiving, by the processing system, an indication from the communication device that indicates a pause in the presentation of the media content;
determining, by the processing system, a plurality of attributes associated with the pause wherein the determining of the plurality of attributes comprises determining a length of the pause;
determining that the length of the pause exceeds a threshold;
determining that the communication device is stationary;
determining, by the processing system, that at least one person has joined a room in which the presentation of the media content is displayed, and determining an eye gaze of the at least one person; and
providing, by the processing system, instructions to the communication device according to the plurality of attributes associated with the pause, wherein the providing of the instructions comprises:

responsive to the determining that the length of the pause exceeds the threshold, and responsive to the determining that at least one person has joined the room, instructing the communication device to provide a summary of the media content, based at least in part on the eye gaze of the at least one person; and responsive to the determining that the communication device is stationary, instructing the communication device to display a visual advertisement.

16. The method of claim 15, wherein the determining of the plurality of attributes further comprises determining a type of content of the media content prior to the pause within the media content, and wherein the providing of the instructions further comprises providing instructions to the communication device to display a first pause content during the pause according to the type of content, and to modify the first pause content to include the visual advertisement when the communication device is determined to be stationary.

17. The method of claim 15, wherein the determining of the plurality of attributes further comprises determining a scene of the media content presented during the pause, and wherein the providing of the instructions further comprises providing instructions to the communication device to adjust the scene presented during the pause.

18. The method of claim 15, wherein the providing of the instructions further comprises:

responsive to the determining that the length of the pause exceeds the threshold, providing instructions to the communication device to resume the media content to a time period prior to the pause.

19. The method of claim 15, wherein the providing of the instructions further comprises providing instructions to the communication device to provide social media engagement regarding the media content to a user associated with the communication device.

20. The method of claim 15, wherein the determining of the plurality of attributes further comprises determining an unprompted cause of the pause, and wherein the providing of the instructions further comprises providing instructions to adjust pause content based on the unprompted cause.

* * * * *